United States Patent
Håland

[19]

[11] Patent Number: 6,129,376
[45] Date of Patent: Oct. 10, 2000

[54] SAFETY ARRANGEMENT

[75] Inventor: Yngve Håland, Falsterbo, Sweden

[73] Assignee: Autolive Development AB, Vagarda, Sweden

[21] Appl. No.: 09/230,759

[22] PCT Filed: Jul. 30, 1997

[86] PCT No.: PCT/SE97/01317

§ 371 Date: Jul. 19, 1999

§ 102(e) Date: Jul. 19, 1999

[87] PCT Pub. No.: WO98/05534

PCT Pub. Date: Feb. 12, 1998

[30] Foreign Application Priority Data

Aug. 1, 1996 [GB] United Kingdom .................. 9616229

[51] Int. Cl.$^7$ .................................................. B60R 21/02
[52] U.S. Cl. ........................................ 280/730.1; 280/753
[58] Field of Search ................................. 280/730.1, 753

[56] References Cited

U.S. PATENT DOCUMENTS 5,839,756  11/1998  Schenck et al. ........................ 280/753

FOREIGN PATENT DOCUMENTS

| 1922159 | 11/1970 | Germany | 280/730.1 |
|---|---|---|---|
| 23 33 498 A1 | 7/1973 | Germany . | |
| 35 31 805 A1 | 3/1987 | Germany . | |
| 44 45 485 C1 | 2/1996 | Germany . | |
| 44 45 487 C1 | 2/1996 | Germany . | |

*Primary Examiner*—Kenneth R. Rice
*Attorney, Agent, or Firm*—Venable; George H. Spencer; Robert Kinberg

[57] ABSTRACT

A safety arrangement in a motor vehicle includes a support (8) located on the floor (2) of a motor vehicle in front of the front seat (1). The support (8) has an upper surface which is raised to an elevated position to provide yieldable support for the feet of the occupant of the vehicle if an accident occurs. The support (8) may comprise an air-bag associated with a gas generator (6) and a crash sensor (5). When an accident occurs, the feet of the occupant of the vehicle are raised to an elevated position.

2 Claims, 2 Drawing Sheets

SAFETY ARRANGEMENT

BACKGROUND OF THE INVENTION

THE PRESENT INVENTION relates to a safety arrangement, and more particularly relates to a safety arrangement in a motor vehicle, such as a motor car.

When a motor vehicle is involved in a frontal impact, there is a risk that an occupant of the front seat of the motor vehicle may suffer injury to the feet, legs or knees.

For example, injuries can occur in the foot or ankle due to a short, rapid acceleration of the floor in the foot well. In a typical accident situation, the floor may accelerate upwardly and inwardly with an instantaneous acceleration which may be as high as 1,000 g. Since the feet and legs of an occupant of a motor vehicle may well be resting on the floor, and will have inertia, it is to be appreciated that this high acceleration of the floor may cause substantial injuries to the feet and/or lower legs of the occupants of the vehicle. Similar injuries may also arise if the floor of the foot well is penetrated by, for example, part of the suspension of the vehicle, or some other component which is driven rearwardly into the foot well as a consequence of the accident. Sometimes fractures of the lower leg are experienced as a consequence of the leg being trapped under the fascia, and the situation may be made worse if the floor or fascia is penetrated by components driven rearwardly during the accident.

Further injuries can be caused to the knees of the occupant and, additionally, injuries can be caused by the feet or legs of the occupant impacting with the pedals present in the motor vehicle.

Various proposals have been made previously in attempts to overcome these problems. For example, DE-A-4,335,511 discloses a complex arrangement in which the pedals are retracted to a position in which they are unlikely to injure the occupant of the vehicle in the event that an accident should arise. Various types of padding have also been proposed to provide protection for the knees of an occupant of a vehicle, the padding comprising an air-bag, a resilient element or even a resilient element mounted on a movable support. Reference may be made to DE-A-2,109,637, DE-A-4, 243, 791 and DE-A-4, 301, 933.

SUMMARY OF THE INVENTION

According to this invention there is provided a safety arrangement in a motor vehicle, the arrangement comprising support beams initially located on the floor in front of a front seat of the vehicle, which means present an upper surface, accident responsive means being provided which respond to an accident situation to cause the upper surface of the support means to move to an elevated position, wherein the support means comprises an air-bag and the upper surface, when in the elevated position, provides a yieldable support for the feet of an occupant of the vehicle.

Preferably the accident responsive means comprises means to inflate the air-bag and a sensor to sense an accident to activate the means which inflate the air-bag.

The prior proposed arrangements are relatively complex, and the present invention seeks to provide an improved safety arrangement for use in a motor vehicle.

In a preferred embodiment means are provided to retain part of the or each flexible element in a predetermined position adjacent a junction between two non-aligned portions of the floor of the vehicle.

BRIEF DESCRIPTION OF THE DRAWINGS

In order that the invention may be more readily understood, and so that further features thereof may be appreciated, the invention will now be described, by way of example, with reference to the accompanying drawings in which.

Throughout the drawings, like references relate to like parts.

DETAILED DESCRIPTION OF THE INVENTION

Figure 1:
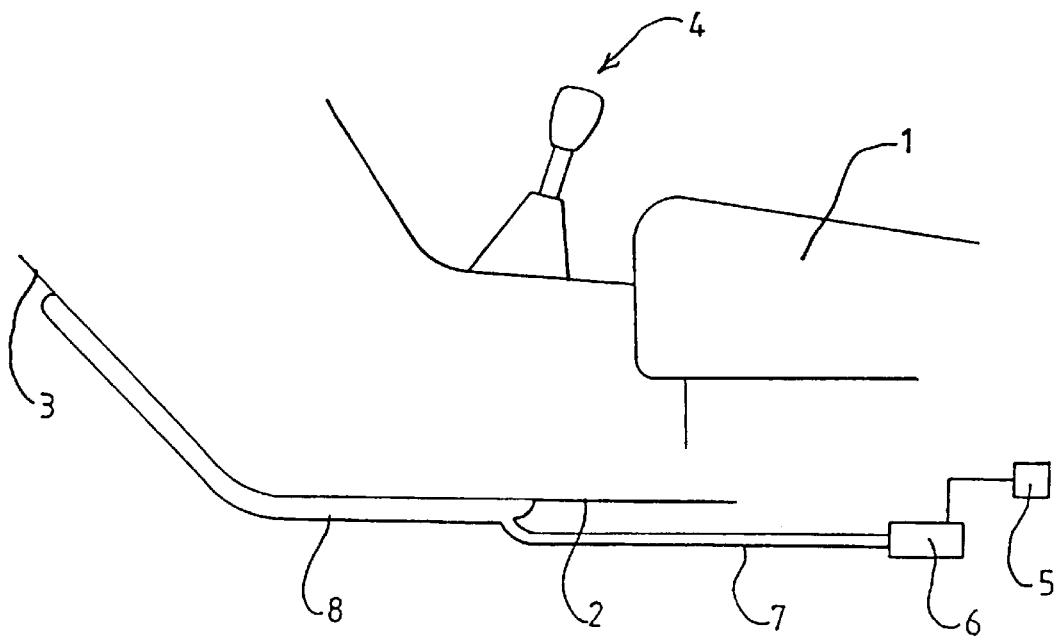
FIG. 1 is a diagrammatic cross-sectional view of one safety arrangement in accordance with the invention in an initial state.
Figure 2:
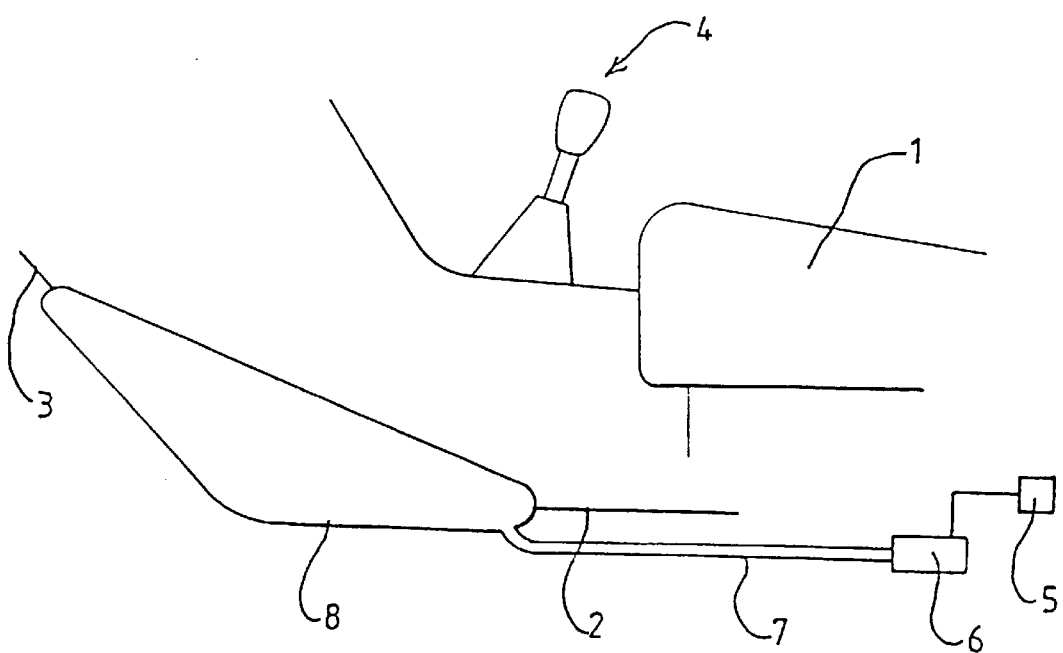
FIG. 2 is a view corresponding to FIG. 1 showing the safety arrangement of FIG. 1 in an operative state.

Referring initially to FIGS. 1 and 2 of the accompanying drawings, a safety arrangement is illustrated which is mounted in position in a motor vehicle. The front seat 1 of the motor vehicle is visible, as is floor 2 in the front of the front seat and an inclined scuttle 3 which is located further forwardly within the motor vehicle. The floor 2 and the scuttle 3 together form a foot well. The gear stick 4 is also illustrated.

A crash sensor 5 is provided adapted to sense a frontal impact or a severe deceleration of the motor vehicle. The sensor 5 is adapted to control a gas generator 6 which generates gas. The gas generator 6 may comprise a pyrotechnic device or may comprise a source of compressed gas.

A duct 7 leads from the gas generator to an air-bag 8 which, as shown in FIG. 1, has an initial uninflated position in which the upper surface of the air-bag is flush with the floor 2 located in front of the seat 1 and with the sloping scuttle 3.. The scuttle 3 slopes, whereas the floor 2 is horizontal. The scuttle 3 is thus not aligned with the floor 2.

It is to be appreciated that the arrangement shown in FIG. 1 will be totally unobtrusive when in the condition illustrated. A carpet may be located resting on the floor above the air-bag 8 and resting on the scuttle 3.

In the event that an accident should be sensed by the sensor 5, the gas generator 6 will be activated and gas will flow through the conduit 7 to inflate the air-bag 8. The air-bag will then have the condition illustrated in FIG. 2.

It is to be appreciated that the upper surface of the air-bag will have been elevated as a consequence of the inflation of the air-bag.

If a person is occupying the seat 1 when the air-bag is inflated, the feet of the person occupying the seat will be elevated as the air-bag 8 inflates. The air-bag will form a relatively soft yieldable cushion located beneath the feet of the occupant of the vehicle.

It is to be appreciated that with the feet of the occupant elevated, even if the floor of the motor vehicle is given a very high acceleration, because the feet of the occupant are not in contact with the floor, no severe injury will be imparted immediately to the feet or legs of the occupant of the vehicle. The air-bag will act as a "cushion" between the floor and the feet of the occupant, and even if the feet of the occupant remain in their elevated position as the floor accelerates inwardly, because there is no contact between the floor and the feet of the occupant, no injury will be inflicted on the feet of the occupant by the floor. Also, of course, there is a minimal risk of any item penetrating the foot well and injuring the feet of the occupant of the vehicle. Also, since the knees of the occupant will also be elevated, the risk of injury occurring to the knees of the occupant of the vehicle is also reduced. Furthermore, since the upper surface of the air-bag will have elevated the feet of the occupant of the seat above the pedals of the vehicle (assuming that the occupant of the seat is the driver of the vehicle), there is no need to provide any complicated mechanism to move the pedals to a retracted position.

Figure 3:
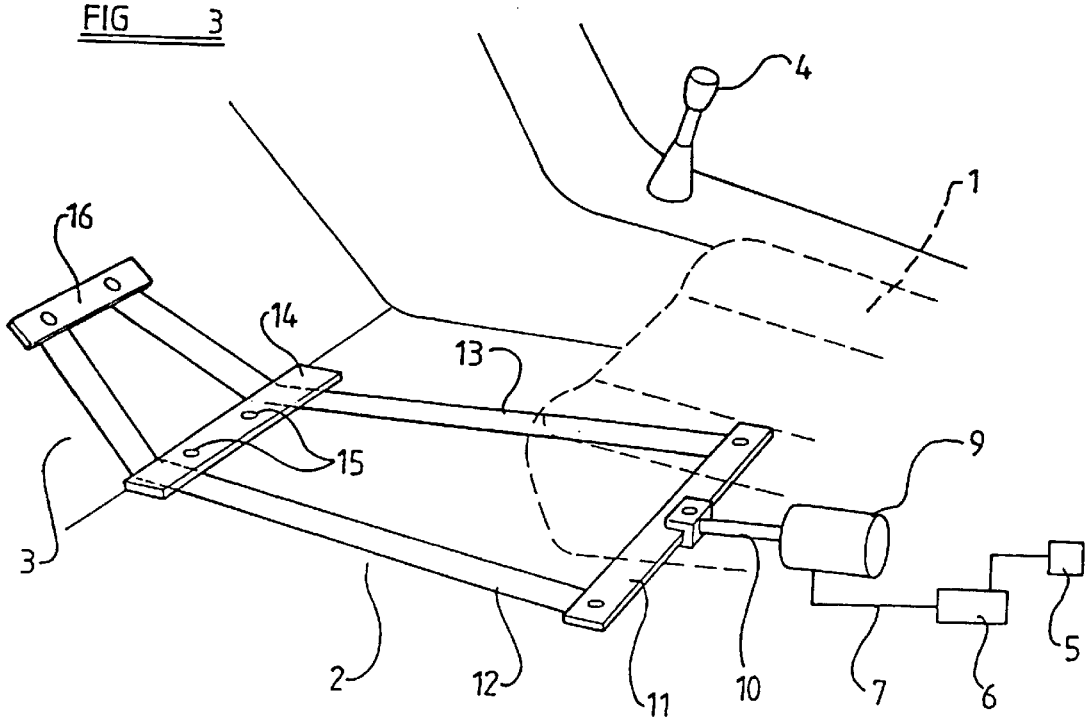
FIG. 3 is a view illustrating the operative parts of a safety arrangement comprising a second embodiment of the invention in a preliminary state.
Figure 4:
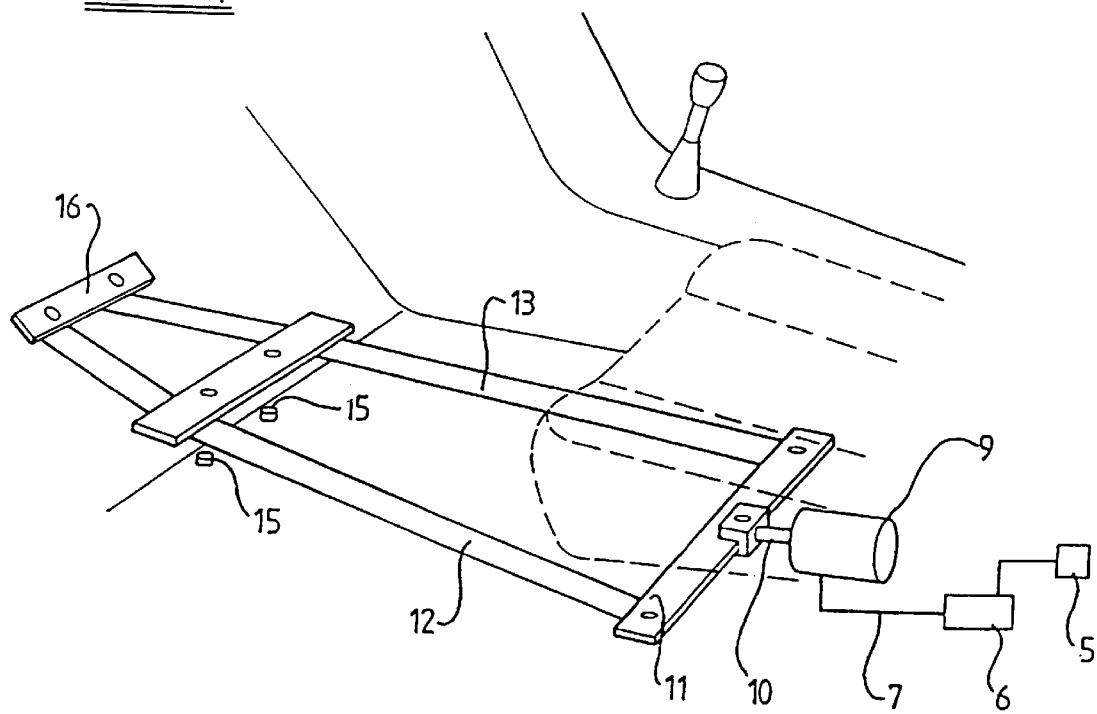
FIG. 4 is a corresponding view illustrating the safety arrangement of FIG. 3 in the operative state.

FIGS. 3 and 4 illustrate an alternative embodiment of the invention. Again the front seat 1, floor 2 and scuttle 3 are illustrated, together with the gear stick 4.

The crash sensor 5 is again associated with a gas generator 6. The gas generator 6, however, supplies gas through a conduit 7 to a piston and cylinder device 9. A shaft 10, which is connected to the piston, extends from the piston-and-cylinder device 9 and engages a transverse bar 11. Each end of the transverse bar 11 is connected to a flexible element comprising length of strap 12, 13. Instead of two straps, a single sheet of flexible material could be utilised. Each length of strap 12, 13 extends across the floor 2 to a position adjacent the junction between the floor 2 and the scuttle 3. A retaining bar 14 extends across the straps and is retained in position by releasable connecting elements 15. Terminal portions of the straps 12, 13 extend up the scuttle 3 to a terminal retaining bar 16 which secures the ends of the straps 12, 13 to the scuttle 3. Thus, each strap initially extends along a non-linear path extending across the floor of the vehicle in front of the seat.

In the event that an accident should arise, the sensor 5 will activate the gas generator 6, causing the piston to be drawn into the cylinder of the piston-and-cylinder device 9. This draws the transverse bar 11 rearwardly, applying tension to the straps 12, 13. The straps 12, 13 tend to rise, and the retaining bar 14 becomes disengaged from the releasable connectors 15. The straps thus become tensioned, as illustrated in FIG. 4. The straps then follow a substantially linear path.

The upper surface of the straps thus become elevated above the floor 2 and scuttle 3, causing any carpet present on top of the straps also to rise. The arrangement again effectively provides a yieldable support for the feet of the occupant of the vehicle, with the feet of the occupant of the vehicle being raised to an elevated position.

What is claimed is:

1. A safety arrangement in a motor vehicle, the arrangement comprising support means initially located on the floor in front of a front seat of the vehicle, which means present an upper surface, accident responsive means being provided which respond to an accident situation to cause the upper surface of said support means to move to an elevated position, characterised by the support means comprising an air bag and the upper surface, when in the elevated position, providing a yieldable support for the feet of an occupant of the vehicle.

2. A safety arrangement according to claim 1 characterised by said accident responsive means comprising means to inflate the air-bag and a sensor to sense an accident to activate the means which inflate the air-bag.

* * * * *